United States Patent [19]

Watanabe

[11] Patent Number: 5,267,589
[45] Date of Patent: Dec. 7, 1993

[54] PIEZOELECTRIC PRESSURE CONTROL VALVE

[75] Inventor: Shunso F. Watanabe, Livonia, Mich.

[73] Assignee: Ford Motor Company, Dearborn, Mich.

[21] Appl. No.: 43,127

[22] Filed: Apr. 5, 1993

[51] Int. Cl.⁵ .................... F16K 31/70; F16K 11/18
[52] U.S. Cl. .................... 137/625.65; 137/625.27; 251/129.06
[58] Field of Search ............ 251/331, 129.06; 137/625.65, 625.27

[56] References Cited

U.S. PATENT DOCUMENTS

| | | |
|---|---|---|
| 4,690,465 | 9/1987 | Takeda et al. |
| 4,740,041 | 4/1988 | Pannbacker |
| 4,768,751 | 9/1988 | Giachino et al. |
| 4,854,424 | 8/1989 | Yamatoh et al. |
| 4,965,729 | 10/1990 | Hafner |
| 5,000,521 | 3/1991 | Majima et al. |
| 5,029,805 | 7/1991 | Albarda et al. ............ 251/129.06 X |
| 5,067,778 | 11/1991 | Testardi |
| 5,161,774 | 11/1992 | Engelsdorf et al. ........ 251/129.06 X |

FOREIGN PATENT DOCUMENTS

| | | |
|---|---|---|
| 60-81527 | 5/1985 | Japan |
| 60-139563 | 7/1985 | Japan |

OTHER PUBLICATIONS

Hal Jerman, Electrically-Activated, Normally-Closed Diaphragm Valves, 91CH2817-May 1991 IEEE.

*Primary Examiner*—Arnold Rosenthal

[57] ABSTRACT

A piezoelectric pressure control valve (10) comprising a bimorph (48) with a characteristic that as a potential difference is applied thereto, one surface expands and the other contracts, thereby deflecting the bimorph. The valve includes a supply port (14) for introducing fluid and a chamber (16) defined within the valve body. An outlet port (18) is in communication with the chamber. A top valve plate (22) and a contiguous bottom valve plate (24) are supported within the chamber, each valve plate having an anchored end (26, 28) affixed to a wall of the chamber, the anchored end of the top valve plate being provided with an inlet channel (30) in communication with the supply port, and a metering orifice (40, 42) disposed within each valve plate. A double poppet valve head (44) is seatable within the associated metering orifice, the poppet valve head being continuously displaceable between an open position and a normally closed position. The bimorph (48) cooperates with a spring (54) affixed to each valve plate, the spring (54) reverting the poppet valve head to the normally closed, seated position against fluid pressure and registering the poppet valve head within the metering orifice. An electrical circuit (56) is connected to the bimorph, the circuit providing the potential difference to the bimorph, which is regulated in accordance with an input signal delivered to the circuit. An input signal generator (58) operates in response to a sensed condition, the fluid flow in the outlet port being continuously modulated in response to the sensed condition.

20 Claims, 2 Drawing Sheets

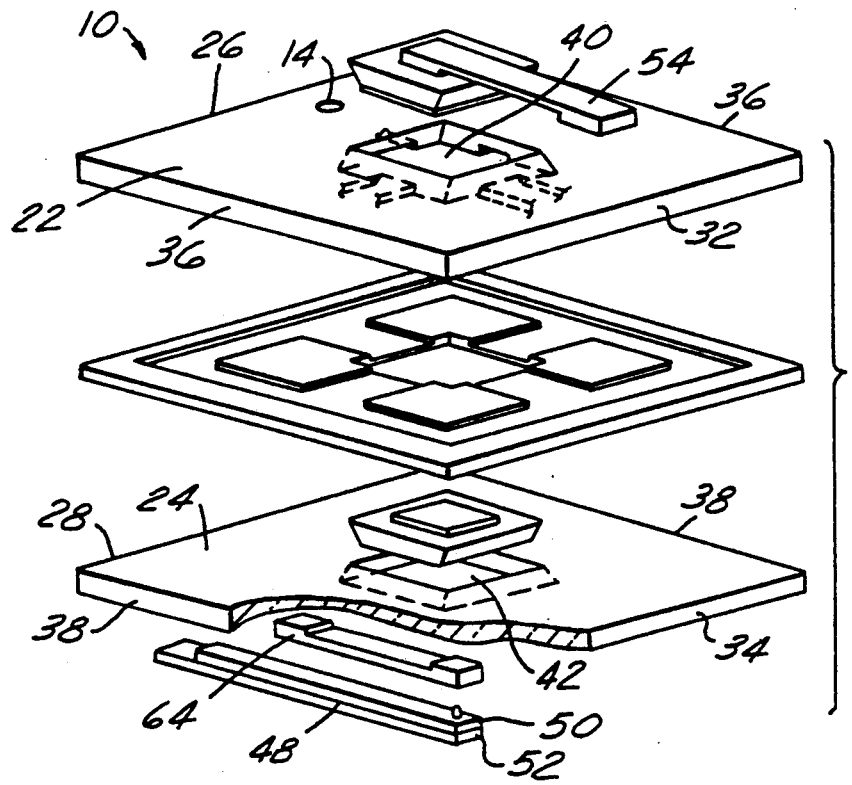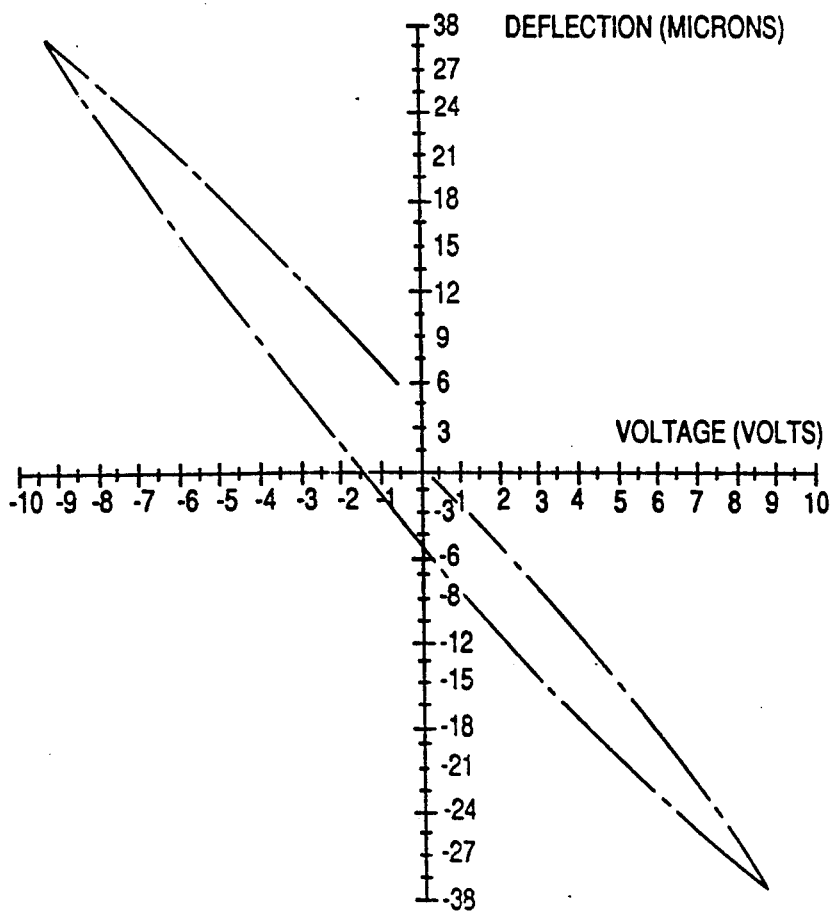

PIEZOELECTRIC PRESSURE CONTROL VALVE

BACKGROUND OF THE INVENTION

1. Field of the Invention

The present invention is concerned with piezoelectric pressure control valves. More specifically, the invention relates to a valve used in conjunction with a system, such as an anti-lock braking system, which requires high frequency actuation capabilities.

2. Background Art

The piezoelectric effect was discovered by Jacques and Pierre Curie in 1880. They found that certain materials deform when exposed to an electrical field. This has become known as the inverse piezoelectric effect. The effect is practically linear, i.e., the deformation varies directly with the applied potential difference. It is also direction-dependent, so that if the material is exposed to an electric field, it will experience an elastic strain which causes its length to increase or decrease according to the polarity of the field. This behavior is manifest in such materials as piezoelectric ceramics, which are hard, chemically inert, and completely insensitive to humidity and other atmospheric influences.

As an example of harnessing piezoelectric phenomena, U.S. Pat. No. 4,690,465, which issued on Sep. 1, 1987, discloses an anti-skid hydraulic pressure modulator for a vehicular hydraulic braking system. The system includes a piezoelectrically operated pressure modulator, including a passage which is opened and closed by a piezoelectric actuator. The piezoelectric element expands and contracts almost instantaneously in response to voltage application and voltage drop. However, in such systems, responsiveness is limited in operation by a shut-off valve being positioned either in an "on" or "off" position. Such systems do not exhibit a continuously controlled modulation.

An anti-lock brake system is one example of a device which may be controlled by a pressure control valve. Illustrative of other such devices are vehicular transmission systems, engine intake and outlet valves, and suspension systems. In the past, the effectiveness of such devices has been limited by the inherent sluggishness or delay with which fluid flow, for example, changes in response to a sensed condition (such as applied brake pressure).

A member component of most piezoelectric pressure control valves is a movable spool and seat made of a silicious material such as silicon. Electrically activated, normally closed diaphragm valves have been fabricated using heated bi-metallic diaphragms to provide the operating force. Such valves have been designed to provide proportional control of flows at various input pressures. The valves are fabricated using silicon micromachining techniques. In an article entitled "Electrically Activated, Normally-Closed Diaphragm Valves" by H. Jerman (91CH2817-5/91 IEEE), the author observes that conventional valves for flow control have typically used magnetic actuation in the form of solenoids or motors to drive spool valves. The reference notes that valve actuation is possible using piezoelectric drivers, but the properties of such materials produce high forces with a very small deflection for button-type actuators. The reference states that such a driver has been reported as a valve actuator, but the complicated assembly and high voltage operation is said to be unattractive for many commercial applications.

Commonly assigned U.S. Pat. No. 4,768,751 which issued on Sep. 6, 1988 discloses a silicon micromachined non-elastic flow valve. That reference discloses a valve assembly for controlling fluid flow, including an actuator and a fluid. The actuator separates the nozzle plate from a valve plate, thereby permitting fluid flow. Also disclosed is a spring means for biasing the nozzle plate into a closed position to arrest fluid flow.

Against this background, there remains an unsatisfied need for low cost pressure control valves which can be made in large quantities and which exhibit a higher frequency response than those presently known, wherein there is a continuous modulation of flow output in response to an input signal which is communicated to the valve.

SUMMARY OF THE INVENTION

The present invention is a piezoelectric pressure control valve for delivering hydraulic fluid to a device such as an anti-lock braking system, which is operable in response to the pressure of hydraulic fluid emerging from the valve.

Included in the valve is a bimorph which includes a piezoelectric plate. The plate has the characteristic that as a potential difference is applied, one surface bends, while the other contracts, thereby deflecting the bimorph.

In cooperative relationship with the bimorph is a double poppet valve head which has a periphery that defines sharp metering edges. The head is seated within a rectangular orifice defined within a pair of valve plates provided within a chamber of the valve.

Springs are affixed to the valve plates and the double poppet valve. The springs tend to revert the poppet valve head to its seated (normally closed) position after the bimorph has been deflected by an applied potential difference. To provide the potential difference, an analog circuit is connected to the bimorph. The potential difference applied by the circuit varies in accordance with an input signal generated in response to a condition (such as braking force) sensed in a moving body (such as a car). As a result, the hydraulic fluid pressure is continuously modulated in accordance with the input signal.

It is an object of the present invention to provide a pressure control valve which exhibits a higher frequency response than presently known.

It is also an object of the present invention to provide continuous modulation of fluid pressure in a linear relation with the input signal communicated to the valve.

Further, it is also an object of the present invention to provide a low cost, pressure control valve which can be made in large quantities.

BRIEF DESCRIPTION OF THE DRAWINGS

FIG. 1 is an exploded perspective view of an embodiment of a piezoelectric pressure control valve according to the present invention;

FIG. 5 is a graph illustrating the deflection of a piezoelectric bimorph of the present invention with voltage applied thereto.

BEST MODE(S) FOR CARRYING OUT THE INVENTION

Figure 2:
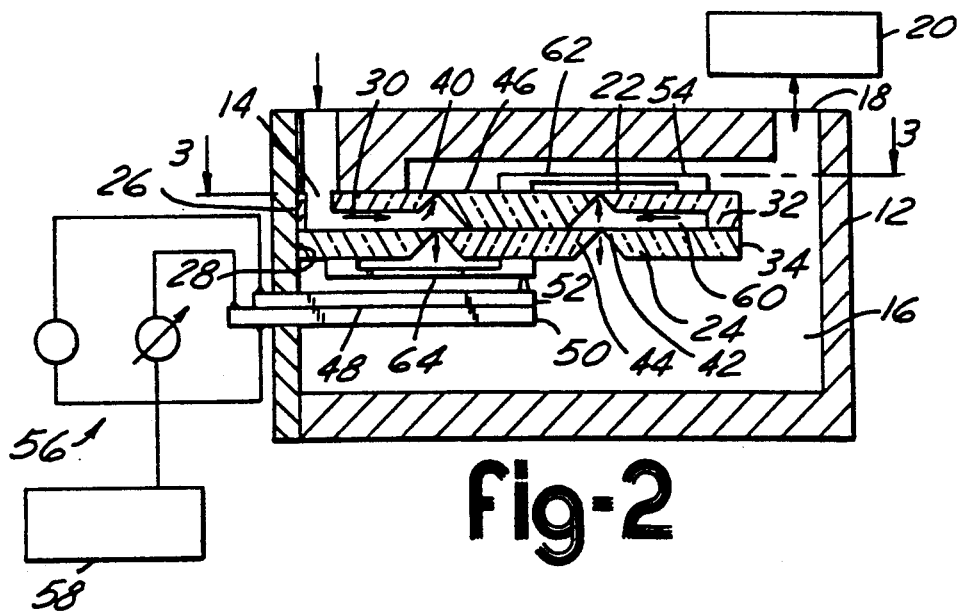
FIG. 2 is a cross-sectional view of another valve embodiment, illustrating the valve in its closed position.

The present invention discloses a piezoelectric pressure control valve 10, which is depicted in FIGS. 1 and 2. The valve includes a valve body 12 with a supply port 14 for introducing hydraulic fluid into the valve at a supply pressure ($P_s$). In communication with the supply port is a chamber 16 and an outlet port 18 which delivers the hydraulic fluid at a control pressure ($P_c$) to a device which is operable in response to the control pressure. Such a device includes but is not limited to an anti-lock braking/traction control system, a vehicular transmission system, an engine intake/outlet valve, and a suspension system. Commonly owned patent application Ser. No. 07/765,613, entitled "Integral Anti-Lock Brake/Traction Control System" was filed on Sep. 25, 1991 and is incorporated herein by reference.

Supported within the chamber 16 is a top valve plate 22 and a bottom valve plate 24. Each valve plate 22,24 has an anchored end 26,28 affixed to a wall of the chamber (not shown in FIG. 1 for simplicity) adjacent to the supply port 14. To permit fluid flow, the anchored end 26 of the top valve plate 22 is provided with an inlet channel 30 (FIGS. 2-3) which is in communication with the supply port.

A metering orifice 40,42 is disposed within each valve plate 22,24. Seatable within each metering orifice is a double poppet valve head 44 which is continuously displaceable between an open position and a normally closed position. The valve head has sharp metering edges 46 that cooperate with the associated metering orifice so that the edges block fluid flow when the valve head is seated.

Located within the chamber 16 is a bimorph 48, which preferably includes two piezoelectric ceramic wafers 50,52 bonded together. Piezoelectric ceramics are known and have been marketed under such trade names as PXE (PIEZOXIDE) by N. V. Philips' Gloeilampenfabrieken, located in The Netherlands. Such materials generally are compounds of lead zirconate and lead titanate. Piezoelectric crystals are polycrystalline ferrolectric materials with the perovskite crystal structure—a tatragonal/rhombahedral structure very close to cubic. Piezoelectric properties are exhibited by a number of naturally occurring crystals, such as quartz, tourmaline, and sodium potassium tartrate.

When two piezoelectric ceramic strips or wafers, polarized in their thickness direction are bonded together, they form the bimorph 48. If they are polarized in opposite directions, they become known as a series bimorph. If polarized in the same direction, they are known as a parallel bimorph.

In the present invention, as depicted in FIGS. 1-2, a piezoelectric ceramic beam, preferably comprising wafers 50,52 are selected so that they have piezoelectric characteristics which are different. As a potential difference is applied across the wafers, one expands and the other contracts, thereby bending the bimorph. Deflection is virtually instantaneous and proportional to the potential difference.

Figure 3:
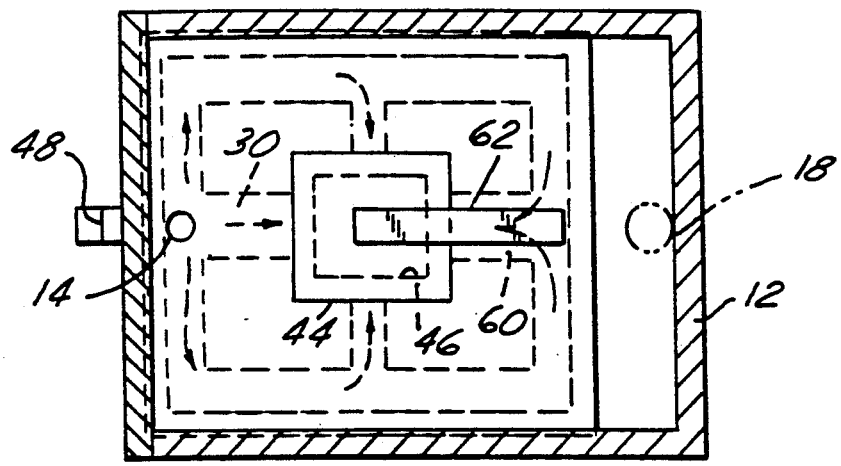
FIG. 3 is a cross-sectional view of the valve depicted in FIG. 2, taken along the line 3—3 thereof.

Turning now to FIGS. 2-3, the anchored end 26 of plate 22 is provided with an inlet channel 30 in communication with the supply port.

A double poppet valve head 44 is seatable within metering orifices 40,42 provided within the valve plates 22,24. The valve head 44 is continuously displaceable between an opened position when the bimorph 48 bends and a normally closed position. The double poppet valve head 44 has sharp metering edges 46 that cooperate with the metering orifices 40,42, the edges blocking fluid flow when the poppet valve head is seated.

To revert the poppet valve head to its normally closed position, means for biasing 54, such as a pair of springs, are affixed to the valve plates 22,24 and the double poppet valve head. The biasing means also serve to register the poppet valve head within the associated metering orifice.

A voltage is applied to the bimorph 48, preferably by an electrical analog charge-drive circuit 56 connected to the bimorph. The voltage is applied in such a way that one wafer contracts while the other expands. Since the wafers are joined together, they bow.

Preferably, in a parallel bimorph configuration, both wafers are polarized in the same direction and are connected in parallel. This offers higher sensitivity and the possibility of applying a bias voltage to generate an electric field parallel to the direction of polarization, thus eliminating the risk of depolarization. Deflection in this configuration is high, and blocking forces are relatively low.

The analog charge-drive circuit 56 applies a potential difference to the bimorph, which is regulated in accordance with an input signal delivered to the circuit. The input signal is provided by an input signal generating means 58, such as a microprocessor in response to a parameter characteristic of a sensed condition. For simplicity, details of the microprocessor are omitted, as they fall within the purview of those skilled in the art. As an example, the microprocessor may generate the input signal in response to a parameter such as wheel rotational speed sensed in a moving car.

As a result, the hydraulic fluid pressure from the valve ($P_c$) is continuously modulated in a linear relation with the input signal.

The analog charge-drive circuit exploits the fast response of high power actuators. The circuit delivers high currents at high voltage levels during short periods. Essentially, the bimorph is a capacitive device. Accordingly, power levels can be considerable if the actuator is switched at a high repetition rate.

Preferably, the bimorph is driven by a charge drive circuit in which there is a linear relation between dielectric displacement and deformation (FIG. 5). That figure is an example of the deflection of a piezoelectric actuator as a function of the applied voltage. The curves of FIG. 5 have been measured on a bimorph high power actuator which is assembled from $9 \times 18 \times 1.5$ mm rectangular plates.

Preferably, the analog charge drive circuit of the present invention generates a current to the bimorph which causes a voltage drop across a resistor (not shown). This is used as a feedback signal for an operational amplifier. The current to the bimorph, and thus the charge, is regulated according to the input voltage. This charge-drive circuit produces a linear response between the input and output voltages.

It should be appreciated that though a bimorph has been disclosed herein, a configuration known as a monomorph may also be applicable. In a monomorph, a ceramic element is bonded to a metal disk such that the configuration is planar in the absence of any potential difference applied across the ceramic element and metal disk. Before a voltage is applied opposite to polling, the piezoelectric ceramic expands. If the voltage is applied in the direction of polling, the piezoelectric ceramic shrinks.

Referring now with primary reference to FIG. 2, the top valve plate 22 is provided with a free end 32 that defines an inlet channel 30 which is in communication with the supply port. The associated fluid flows are depicted in FIGS. 2-3. The hydraulic fluid enters the valve body 12 at the supply port 14, whence it enters fluid inlet channel 30 toward the metering edges 46, which cooperate with the double poppet valve head 44.

Preferably, the valve plates 22,24 are formed from silicon and the metering edges are formed by a technique such as that disclosed in commonly-owned, copending patent application Ser. No. 986,313, filed on Dec. 7, 1992, entitled "Micro-Valve And Method of Manufacture," the disclosure of which is incorporated herein by reference. Preferably, the metering orifice provided within each valve plate is rectangular.

As illustrated in FIG. 2, biasing means 54 include a top spring 62 extending between the free end of the top plate and the double poppet valve head, and a bottom spring 64 extending between the anchored end of the bottom valve plate and the double poppet valve head.

In operation, the bimorph 48 cooperates with the double poppet valve head 44 such that the latter is urged toward an open position when the bimorph is bent. In that configuration, the piezoelectric pressure control valve is opened and hydraulic fluid is allowed to flow toward the outlet port 18.

Figure 4:
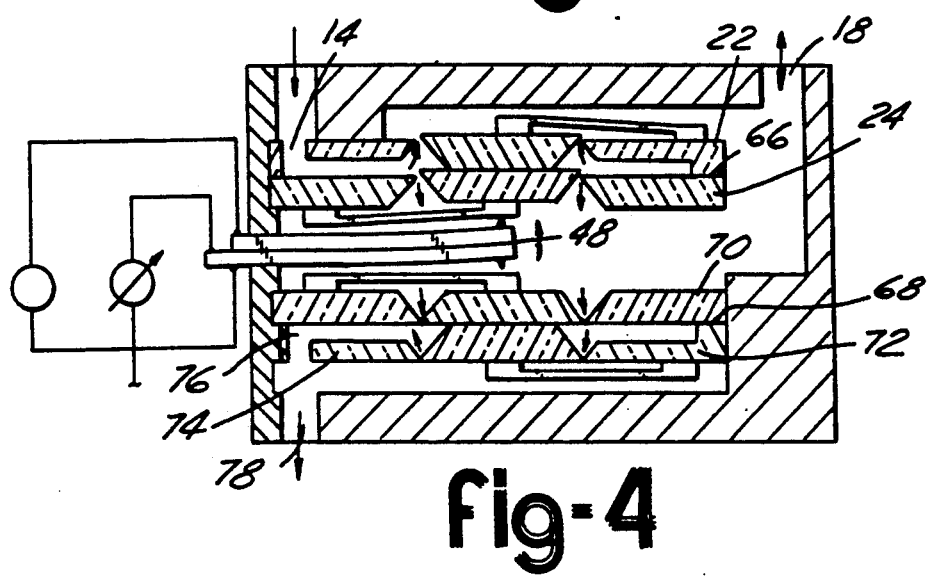
FIG. 4 is a cross-sectional view of an alternate embodiment of the present invention, illustrating the valve in an opened position.

A second alternative embodiment of the present invention is depicted in FIG. 4. In that embodiment, the top and bottom valve plates 22,24 define a first pair of valve plates 66. A second pair 68 of valve plates is disclosed in operative communication with the bimorph 48.

The second pair of valve plates 68 include a top valve plate 70 and a bottom valve plate 72. The latter plate has an anchored end 74 that is provided with an outlet channel 76 in communication with a return port 78 defined within the valve body.

In the embodiment depicted in FIG. 4, the bimorph 48 is deflected upon applying a potential difference thereto, so that the bimorph may move continuously towards a top deflected position, wherein the double poppet valve head associated with the top pair of valve plates is opened, while the double poppet valve head associated with the bottom pair of valve plates remains closed. From that position, the deflection of the bimorph may revert to a normally closed position.

When the bimorph is deflected downwardly, the double poppet valve head associated with the second pair of valve plates 68 is urged toward an open position, away from its normally closed position against seating forces exerted by a spring associated with the bottom valve plate 72 of the second pair 68. At the same time, the double poppet valve head associated with the first pair 66 is in its seated, normally closed position, thereby precluding passage of the hydraulic fluid toward the outlet port 18.

For a brake control application, exemplary operating ranges are a supply pressure ($P_s$) between 0 and 1000 psi and a control pressure ($P_c$) in the range of 1500-2200 psi. A frequency response in excess of about 500 cycles per second is realized.

In this example, proportional control of the regulated pressure ($P_c$) was demonstrated. The fluid flow rate was measured at 2.6 cubic inches per second maximum and $P_c$ was about 1500 psi. The normal range of fluid flow was up to 0.52 cubic inches per second.

Commercially available brake fluid was used with a viscosity of 500 SUS. The flow channel cross-sectional area was about 0.0064 square inches. The response time achieved was 100 Hz frequency response (0.002 seconds to 63% of stat). The piezoelectric materials used were NTK or NGK.

Thus, there has been disclosed a piezoelectric pressure control valve which exhibits a higher frequency response than presently known. The valve provides a continuous modulation of fluid pressure in a linear relationship with the input signal communicated to the valve. Additionally, the valve of the present invention can be fabricated at a relatively low cost in production quantities.

I claim:

1. A piezoelectric pressure control valve comprising:
    a valve body having
        a supply port for introducing hydraulic fluid into the valve;
        a chamber defined within the valve body; and
        an outlet port in communication with the chamber, the outlet port being capable of delivering the hydraulic fluid to a controlled device which is operable in response thereto;
    a top valve plate and a contiguous bottom valve plate supported within the chamber,
        each valve plate having
            an anchored end affixed to a wall of the chamber adjacent to the supply port, the anchored end of the top valve plate being provided with an inlet channel in communication with the supply port; and
            a metering orifice disposed within each valve plate,
    a double poppet valve head which is seatable within the associated metering orifice, the poppet valve head being continuously displaceable between an open position and a normally closed position, the double poppet valve head having sharp metering edges that cooperate with the associated metering orifice, the edges blocking fluid flow when the poppet valve head is seated;
    a bimorph having a characteristic that as a potential difference is applied thereto, one surface expands and the other contracts, thereby deflecting the bimorph,
    means for biasing affixed to each valve plate, the biassing means reverting the poppet valve head to the normally closed seated position against fluid pressure and registering the poppet valve head within the metering orifice;
    an electrical circuit connected to the bimorph, the circuit providing the potential difference to the bimorph, which is regulated in accordance with an input signal delivered to the circuit; and
    means for generating the input signal in response to a sensed condition,
    the fluid flow in the outlet port being continuously modulated in response to the sensed condition.

2. The piezoelectric pressure control valve of claim 1 wherein the top valve plate is provided with a free end that defines an inlet channel in communication with the supply port.

3. The piezoelectric pressure control valve of claim 1 wherein the valve plates are formed from silicon.

4. The piezoelectric pressure control valve of claim 1 wherein the metering orifice provided within each valve plate and the double poppet valve head is rectangular.

5. The piezoelectric pressure control valve of claim 1 wherein the bimorph includes one or more piezoelectric wafers bonded together such that deflection of the bimorph occurs upon the application of a potential difference across the one or more piezoelectric wafers.

6. The piezoelectric pressure control valve of claim 1 wherein the means for biasing include a top spring extending between the free end of the top plate and the double poppet valve head; and
 a bottom spring extending between the anchored end of the bottom valve plate and the double poppet valve head.

7. The piezoelectric pressure control valve of claim 1 wherein the bimorph cooperates with the double poppet valve head such that the double poppet valve head is urged toward an open position when the bimorph is bent, thereby opening the piezoelectric control valve and allowing hydraulic fluid to flow toward the outlet port.

8. The piezoelectric pressure control valve of claim 1 wherein the electrical circuit comprises an analog drive circuit which includes an analog charge-drive circuit.

9. The piezoelectric pressure control valve of claim 1 wherein the sensed condition is brake pressure and the controlled device is an anti-lock brake/traction control system.

10. The piezoelectric pressure control valve of claim 1 wherein the top and bottom valve plates define a first pair of valve plates, the control valve further comprising:
 a second pair of valve plates disposed in operative communication with an opposing face of the bimorph.

11. The piezoelectric pressure control valve of claim 10 wherein the second pair of valve plates includes a top valve plate and a bottom valve plate having an anchored end that is provided with an outlet channel in communication with a return port defined with the valve body.

12. The piezoelectric pressure control valve of claim 11 wherein the bimorph is deflected upon applying a potential difference thereto so that the bimorph may move continuously between a top deflected position wherein the double poppet valve head associated with the top pair of valve plates is opened, while the double poppet valve head associated with the bottom pair of valve plates is closed.

13. The piezoelectric pressure control valve of claim 12 wherein the bimorph is deflected so that the bimorph may move continuously between a bottom deflected position wherein the double poppet valve head associated with the bottom pair of valve plates is open, while the double poppet valve head associated with the top pair of valve plates is closed.

14. The piezoelectric pressure control valve of claim 1 wherein the bimorph includes two piezoelectric wafers.

15. The piezoelectric pressure control valve of claim 1 wherein the bimorph comprises a piezoelectric ceramic plate.

16. The piezoelectric pressure control valve of claim 1 wherein the bimorph comprises a series bimorph.

17. The piezoelectric pressure control valve of claim 1 wherein the bimorph comprises a parallel bimorph.

18. The piezoelectric pressure control valve of claim 1 wherein deflection of the bimorph varies in linear relationship with the input signal.

19. A piezoelectric pressure control valve comprising:
 a valve body having
  a supply port for introducing hydraulic fluid into the valve;
  a chamber defined within the valve body; and
  an outlet port in communication with the chamber, the outlet port being capable of delivering the hydraulic fluid to a controlled device which is operable in response thereto;
 a first pair of valve plates comprising a top valve plate and a contiguous bottom valve plate supported within the chamber,
 a second pair of valve plates comprising a top valve plate and a contiguous bottom valve plate supported within the chamber;
 each valve plate having
  an anchored end affixed to a wall of the chamber adjacent to the supply port, the anchored end of the top valve plate of the first pair and the anchored end of the bottom plate of the second pair being provided respectively with an inlet and an outlet flow channel;
 a metering orifice defined within each valve plate;
 a pair of double poppet valve heads which are seatable within the associated metering orifice, the poppet valve head being continuously displaceable between an open position and a normally closed position, each double poppet valve head having sharp metering edges that cooperate with the associated metering orifice, the edges blocking fluid flow when the poppet valve head is seated;
 a bimorph positioned between and in operative communication with the first and second pair of valve plates, the bimorph having a characteristic that as a potential difference is applied thereto, one surface expands and the other contracts, thereby deflecting the bimorph, in proportion to the potential difference;
 means for biasing affixed to each valve plate, the biassing means reverting the poppet valve head to the normally closed seated position against fluid pressure and registering the poppet valve head within the associated metering orifice;
 an electrical circuit connected to the bimorph, the circuit providing the potential difference to the bimorph, which is regulated in accordance with an input signal delivered to the circuit; and
 means for generating the input signal in response to a sensed condition,
 the fluid flow in the outlet and relief ports being continuously modulated in response to the sensed condition.

20. The piezoelectric pressure control valve of claim 19 wherein the bimorph includes one or more piezoelectric wafers bonded together such that deflection of the bimorph occurs in linear proportion to the application of a potential difference across one or more piezoelectric wafers.

* * * * *